United States Patent [19]

Blok

[11] Patent Number: 4,462,071
[45] Date of Patent: Jul. 24, 1984

[54] SUPPLY SYSTEM
[75] Inventor: Huibert Blok, Hilversum, Netherlands
[73] Assignee: U.S. Philips Corporation, New York, N.Y.
[21] Appl. No.: 389,535
[22] Filed: Jun. 18, 1982
[30] Foreign Application Priority Data
Jun. 25, 1981 [NL] Netherlands ............... 8103063
[51] Int. Cl.³ .......................................... H02M 1/12
[52] U.S. Cl. .................................... 363/44; 363/47
[58] Field of Search ............... 363/44, 45, 47, 48, 363/125, 128
[56] References Cited
U.S. PATENT DOCUMENTS
1,998,325  4/1935  Lyman, Jr. .................. 363/45 X Primary Examiner—William M. Shoop
Attorney, Agent, or Firm—Robert T. Mayer; Bernard Franzblau

[57] ABSTRACT

An electrical power supply system of the kind in which an input alternating voltage or current is rectified in a rectifier circuit (II) and the output is fed to a load (8) via a smoothing filter (III). The combination of the smoothing filter and load are arranged so that the input impedance of the smoothing filter is substantially real for the overall frequency spectrum applied thereto and has substantially the same value for each component of this spectrum thereby reducing distortion of the current and voltage of the AC power supply. In the circuit illustrated this is achieved by choosing the value R of the resistor (11) in the filter to be equal to the resistance of the load and by choosing the values L and C of the inductor (6) and capacitor (7) in the filter so that $L/C = R^2$.

22 Claims, 17 Drawing Figures

SUPPLY SYSTEM

This invention relates to an electrical power supply system comprising a rectifier circuit for an alternating voltage or current, a load, and a smoothing filter coupling the output of said rectifier circuit to said load.

In known power supply systems of this type the problem is encountered that considerable distortion of the current and voltage, respectively, occur at the input of the system due to the action of the rectifier circuit in conjunction with the smoothing filter subsequent thereto.

The nature of the distortion depends on the type of rectifier (half-wave or full-wave) and also on the smoothing filter configuration opted for. The result is that higher harmonics are generated in the alternating current circuit from which the supply system derives energy (mains pollution). When the alternating current source is very remote from the user, for example in the case of remote feeding of repeaters or intermediate regenerators in data transmission systems, this distortion may result in voltage or current waveforms which are unfit for use by the user.

It is an object of the invention to provide, at least, a partial solution for the above-mentioned problem and, to this end, the invention is characterized in that the combination of said smoothing filter and said load is such that the input impedance of said smoothing filter is substantially real for the overall frequency spectrum offered to said filter by said rectifier circuit and has substantially the same value for each component of said frequency spectrum.

Embodiments of the invention will be described, by way of example, with reference to the accompanying diagrammatic drawings. These embodiments are of the kind (although this is not necessarily so in all cases) in which a transformer at the input of the circuit has a centre-tapped secondary winding which feeds a full-wave rectifier.

In the drawings:

FIGS. 2a, b, c, d, and e are diagrams to explain the residual distortion occurring at the input of the embodiment shown in FIG. 1 and of a second embodiment shown in FIG. 3.

Figure 1:
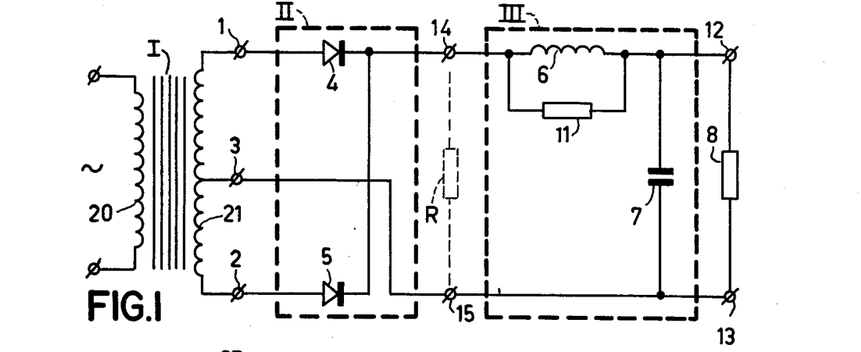
FIG. 1 shows a first embodiment of the invention.

In the supply system shown in FIG. 1, I is an input transformer the primary winding 20 of which is connectable to an alternating current of alternating voltage source. The secondary winding 21 of the input transformer I is connected to input terminals 1 and 2 of a rectifier circuit II. A rectifying element, in this case a diode 4, is provided between the input terminal 1 and an output terminal 14 of the rectifier circuit II. Similarly, a diode 5 is provided between the input terminal 2 and the output terminal 14. The centre tap 3 of the secondary winding 21 of the input transformer I Is connected to an output terminal 15 of the rectifier circuit II. A filter III comprises a choke 6, a resistor 11 and a capacitor 7. The choke 6 and the resistor 11 are arranged between the output terminal 14 of the rectifier circuit II and an output terminal 12 of the supply system. A second output terminal 13 of the supply system is connected to the terminal 15. The capacitor 7 is arranged between the output terminals 12 and 13 of the supply system.

A load in the form of a resistor 8 is also connected between the output terminals 12 and 13 of the supply system. The resistors 11 and 8 each have a resistance value of R ohm. The other elements of the filter III have such a value that the relation $$L/C = R^2 \qquad (1)$$

is satisfied, wherein L is the value of the inductance of the coil 6 and C is the value of the capacitance of the capacitor 7. As the rectifier circuit II is therefore loaded at its outputs 14 and 15 by a network which is commonly referred to as a constant R network, i.e. a network which has a real input impedance which is independent of frequency, distortion will now only occur at the input of the supply system as a result of the fact that the rectifier circuit II does not switch perfectly, which will be further explained with reference to FIG. 2. So as to enable an estimate to be made of the distortion of the input current or input voltage, let it be assumed for the sake of simplicity that the input impedance of rectifier circuit II is that of the series arrangement of the two diodes 4 and 5, which are arranged in anti-parallel, and a resistance R in accordance with relation (1).

Figures 2A, 2B, 2D, 2E:
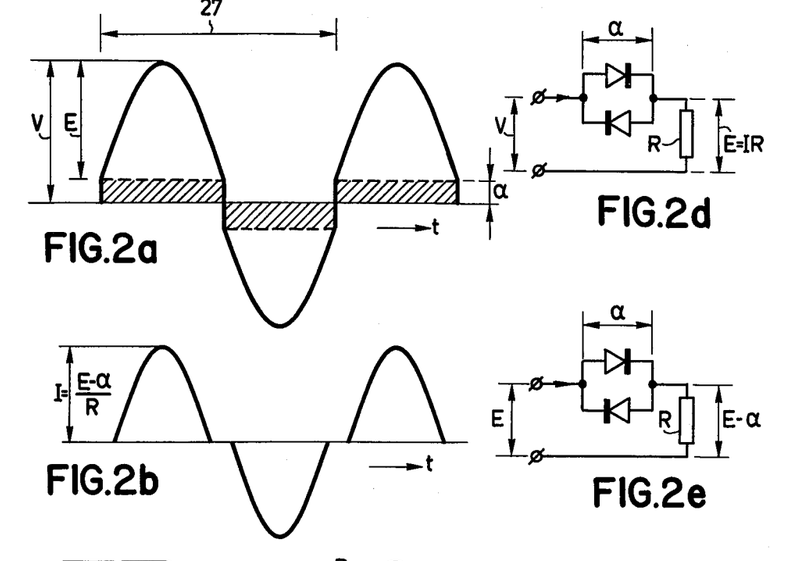

When connected to a sinusoidal current source the voltage V across this impedance (see FIG. 2d) will have a waveform as shown in FIG. 2a. In this Figure $\alpha$ is equal to the threshold voltage of the two diodes 4 and 5 and E is equal to the peak value of the purely sinusoidal voltage present across the said resistance R. The distortion now occurring is caused by the hatched square-wave portion of the wave form. The amplitudes a(n) of the fundamental and the higher harmonics of this square-wave portion satisfy the relation $$a(n) = (4\alpha/n\pi) \cdot \sin n(\pi/2) \qquad (2)$$

from which it will be apparent that, for even values of n, a(n)=0. For a threshold voltage $\alpha \approx 0.5$ Volt the amplitude a(1) of the fundamental is given by a(1)=4(0.5)/$\pi$=0.64 Volt. A simple calculation demonstrates that the harmonics suppression of the voltage across the input impedance of the rectifier circuit satisfies the relation $$\beta(V) = 20. \log (E+0.64) + 20. \log (\pi n/2) \text{dB} \qquad (3)$$

Figure 2C:
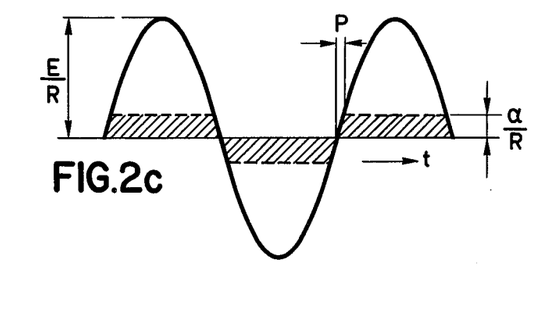

If the said input impedance is connected to a sinusoidal voltage source, then the current flowing through the impedance will have the waveform shown in FIG. 2b, in which (E−$\alpha$)/R is the peak current I flowing through this impedance (see FIG. 2e). The current shown in FIG. 2b may be considered as being formed from a purely sinusoidal current as shown in FIG. 2c reduced by a substantially trapezoidal current. The distortion now occurring is caused by the hatched trapezoidal portion of the current shown in FIG. 2c. The amplitude a(n) of the fundamental and the higher harmonics of this trapezoidal portion satisfy the relation $$a(n) = \frac{4\alpha}{\pi n R} \cdot \sin \frac{n}{2} \pi \cdot \frac{\sin 2np}{2np} \quad (4)$$

wherein p=arc sin α/E. A simple calculation demonstrates that the harmonics suppression of the current flowing through the input impedance of rectifier circuit II satisfies the relation $$\beta(i) = 20.\log(E - 0.64) + 20.\log \frac{\pi n}{2} + 20.\log \left| \frac{2np}{\sin 2np} \right| dB \quad (5)$$

The last term in the relation (5) is of little importance provided $E >> \alpha$ and n is not too large.

Figure 3:
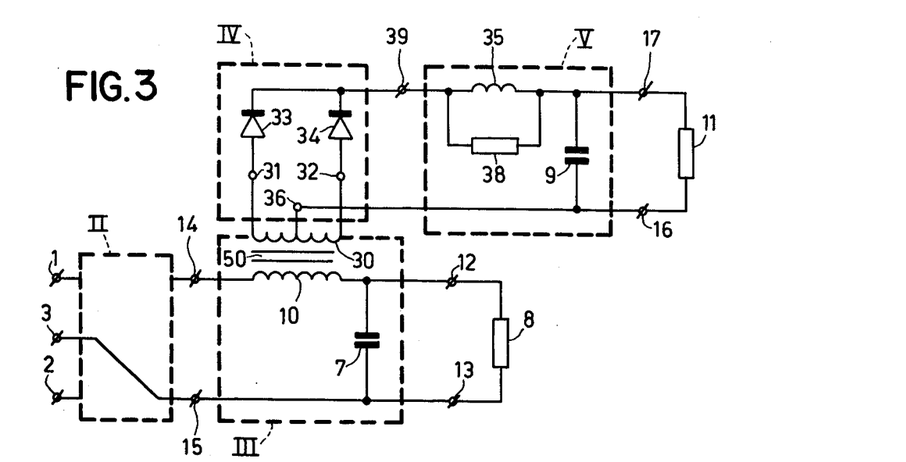
FIG. 3 shows the second embodiment.

In the embodiment shown in FIG. 3, the combination of the choke 6 and the resistor 11 of the embodiment shown in FIG. 1 is replaced by the primary winding of a transformer 50. The primary winding 10 of transformer 50 is arranged between the output terminal 14 of the rectifier circuit II and the output terminal 12 of the supply system. The ends 31 and 32 of the secondary winding 30 of the transformer 50 are connected to an output terminal 39 of a second rectifier circuit IV via respective diodes 33 and 34. The centre tap 36 of the secondary winding 30 is connected to a third output terminal 16 of the supply system. The parallel combination of a choke 35 and a resistor 38 is arranged between the output terminal 39 of rectifier circuit IV and a fourth output terminal 17 of the supply system. A capacitor 9 is connected between the output terminal 16 and 17 of the supply system. A second load resistor 11 is connected between the output terminals 16 and 17. The resistors 11 and 38 have equal resistance values R' and the further elements of filter V have such values that the relation (1) is again satisfied, in this formula R being now replaced by R', L being now the magnitude of the inductance of choke 35 and C being now the value of the capacitance of capacitor 9. The use of the transformer 50 in combination with the second rectifier stage IV and the second smoothing filter V results in a higher efficiency as seen at the combination of the outputs 16 and 17 and the outputs 12 and 13 than is obtainable with the supply system shown in FIG. 1. This will be further explained with reference to FIG. 4 and FIGS. 5a to 5c.

Figure 4:
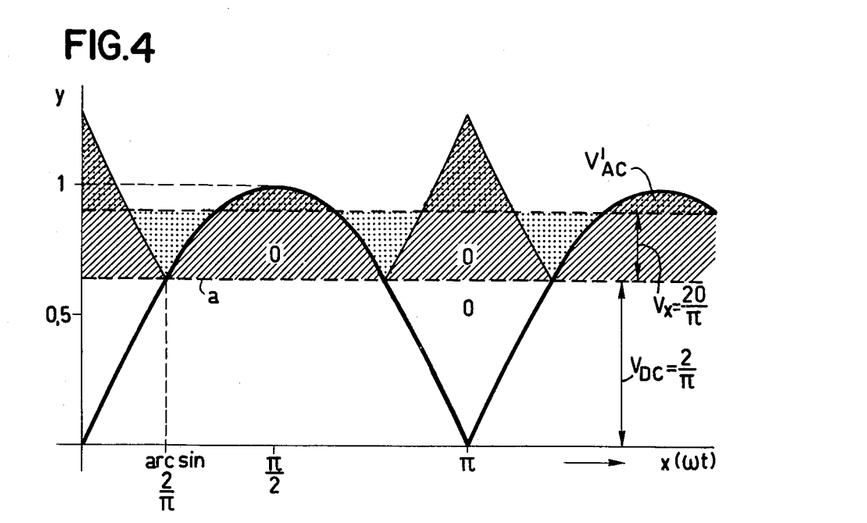
FIG. 4 is a diagram to explain an improvement in efficiency obtainable with the supply system shown in FIG. 3 as compared with the system shown in FIG. 1, FIGS. 5a, b and c show a number of circuits to assist in an understanding of the diagram of FIG. 4, and FIGS. 6a, b, c, d, e and f show a number of possible alternatives to parts of the embodiments of FIGS. 1 and 3.

The solid line curve in FIG. 4 represents the waveform of the voltage at the input of a constant-R smoothing filter in the event that the full-wave rectifier supplying it is energized from a current source producing a sinusoidal signal. As is known, the direct voltage content is $$V_{DC} = (2/\pi) \times \text{the peak voltage}$$

In the diagram the peak voltage is standardized at a value 1. Consequently the total input power of the filter shown in FIG. 5a amounts to:

$$P_i = (1/\sqrt{2})^2 \times 1/Ro = 0.5/Ro (=100\%)$$

The direct current power is dissipated in the load resistor Ro at the output of the filter and amounts to $$P_{DC} V_{DC}^2 / Ro = (4/\pi 2) \times (1/Ro) = 0.4053 \times 1/Ro (=81.06\%)$$

The alternating current power amounts to $$P_{AC} = (0.5/Ro) - (4/\pi 2 Ro) = 0.0947 \times 1/Ro (=18.94\%)$$

This alternating current power is dissipated in the resistor R1, which is connected to the secondary winding of the transformer (50). If the transformation ratio of the transformer 50 is assumed to be equal to 1, which implies that resistor R1 has the same value as resistor Ro, then the alternating voltage across said resistor R1 becomes substantially equal as regards its value and its waveform to the alternating voltage at the input of the filter. The diagram of FIG. 4 shows the waveform of said alternating voltage by means of the solid line curve having as the zero line the line which extends parallel to the X-axis of the diagram at a height $y = 2/\pi$. The area O under this waveform in the diagram can be calculated by means of the formula:

$$O = \left( 2 \int_{\arcsin 2/\pi}^{\pi/2} \sin x \, dx \right) -$$

$$(2/\pi)(\pi - 2 \arcsin 2/\pi) = 0.42103$$

Figure 5A:
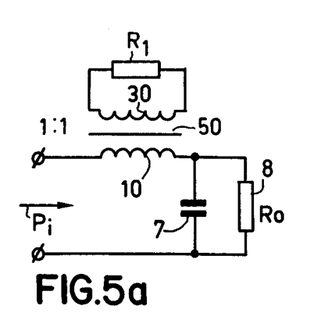
Figure 5B:
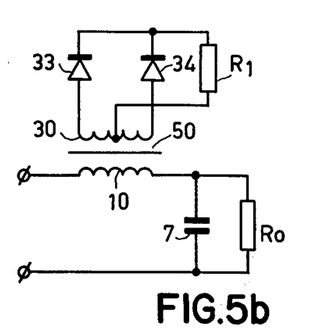

Rectifying this alternating voltage in the manner shown in FIG. 5b produces a voltage V' across R1 as is shown in FIG. 4 by the hatched area O.

The direct voltage value $V'_{DC}$ (denoted in FIG. 4 by $V_x$) is given by means of the equation:

$$V'_{DC} = (2 \times O/\pi) = 0.26803$$

Figure 5C:
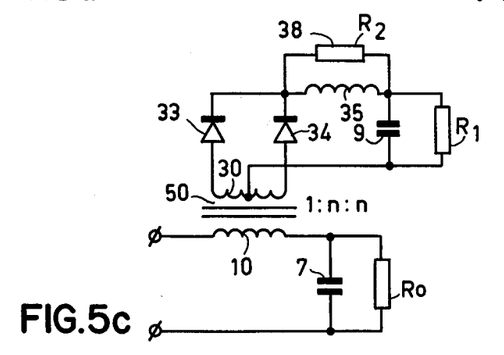

If now a constant-R smoothing filter is arranged again between the rectifier and R1, for example in the manner shown in FIG. 1 (see FIG. 5c) the direct current power is dissipated in the terminating resistor R1 of FIG. 5c and the alternating current power (indicated in the diagram of FIG. 4 in the voltage waveform by the dotted areas $V'_{AC}$) is dissipated in the resistor R2. R2 has a value equal to R1, while the values of the choke 35 and the capacitor 9 are again given by the relation $$L/C = R1R2 = R1^2$$

If in FIG. 5c the transformation ratio n of the transformer is assumed to be equal to unity, then $$R1 = R2 = R0$$

and the power dissipated in R1 is $$P'_{DC} = \frac{(V'_{DC})^2}{Ro} = \frac{4 \times O^2}{\pi^2} \times \frac{1}{Ro} = O^2 P_{DC} = 0.177 \, P_{DC}$$

If this power is added to the direct current power obtained in the first rectifying operation then the total direct current power obtained becomes $$P_{DC} + P'_{DC} = 1.177 P_{DC} \quad (r)$$

The efficiency of the overall supply system then becomes $$1.177 \times 81.06\% = 95.43\% \quad (s)$$

In order to enable the above-mentioned two powers to be combined directly the direct voltage across the resistor R1 in FIG. 5c may be made equal to the voltage across the resistor Ro.

The voltage across Ro is $V_{DC}=2/\pi$

The voltage across R1 is $V'_{DC}=2\times O/\pi$ for the case n=1.

If, instead of this, a transformation ratio $$n=1/O=2.3751$$

is chosen, the voltage across R1 will become equal to the voltage across Ro, the resistors R1 and R2 then both obtaining a value $$R1=R2=(1/O^2)\times Ro=5.6413 Ro$$

Thus, in FIG. 3, the value of each one of the resistors 38 and 11 will have to be 5.6413×R, and the transformation ratio n will have to be 2.3751, if arranging the pairs of terminals 16 and 17 in parallel with 13 and 12 is opted for.

The resulting load resistance of the supply system then has to have a value $$Rp = \frac{5.6413 \times 1}{5.6413 + 1} R = 0.8494 R$$

Adding the two above-mentioned direct current powers $P_{DC}$ and $P'_{DC}$ together may alternatively be effected in a different manner, for example by making the current through the resistor R1 in FIG. 5c equal to the current through the resistor Ro.

The current through Ro has a value $I_{DC}=V_{DC}/Ro$
The current through R1 has a value $I'_{DC}=OV_{DC}/R1$ for the case n=1.

If, instead of this, a transformation ratio n equal to the area O is opted for, the resistors R1 and R2 must both be given a value $R1=R2=O^2 Ro=0.1773 Ro$. The current through R1 then has a value $$I'_{DC}=O^2 V_{DC}/O^2 Ro=V_{DC}/Ro=I_{DC}$$

When this is so R1 and Ro may be arranged in series, i.e. in FIG. 3 terminal 16 may be connected to terminal 12, provided, that the resistors 38 and 11 each have a value of 0.1772×R and the transformation ratio n is equal to 0.42103. The load resistance of the supply system (across output terminals 17 and 13) will then be Rs=1.1773R The calculation which has been performed so far did not take account of power losses which may occur in the transformer 50, the rectifier elements 33 and 34 and the choke 35. Combined together these losses may be considered as a not usefully employable resistance in series with, for example, the centre tap of the secondary winding of transformer 50. The deviation from the given theoretical transformation ratio caused by this and the change in the gain in efficiency can be easily calculated by a person skilled in the art.

In the two cases considered in the foregoing the input impedance of filter III in FIG. 3 has remained equal to the input impedance of filter III in FIG. 1. However, in spite of the input powers being equal, the output power of the supply system shown in FIG. 3 will be increased with respect to the output power of the supply system shown in FIG. 1, as defined in the relations (r) and (s).

FIG. 6 shows a number of filters of the constant-R type which can be used as alternatives to those shown in FIGS. 1 and 3. The filter III of the supply system shown in FIG. 1 or the filter V of the supply system shown in FIG. 3 may be replaced by one of the filters shown in FIGS. 6a, 6b, 6c and 6d. FIGS. 6a and 6b show pure constant-R networks while FIGS. 6c and 6d are derived from these respective networks by making permissible simplifications. In this respect it should be noted that pure constant-R behaviour is usually not required, as a resistive input of constant value is required only for the frequencies produced by the rectifier.

Generally f=0 and f>2×the fundamental frequency of the alternating current signal at the input of the supply system.

In principle it is possible to use still higher order filters as smoothing filters subsequent to the rectifier. However, in practice this would tend to be expensive due to the additional components which would then be required.

Figure 6A:
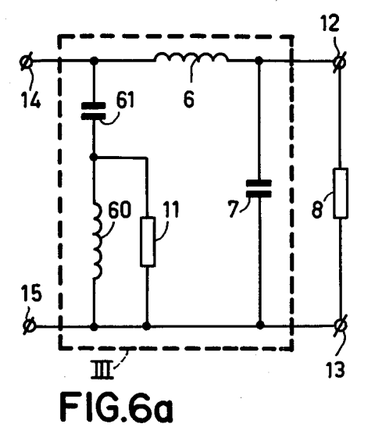
Figure 6B:
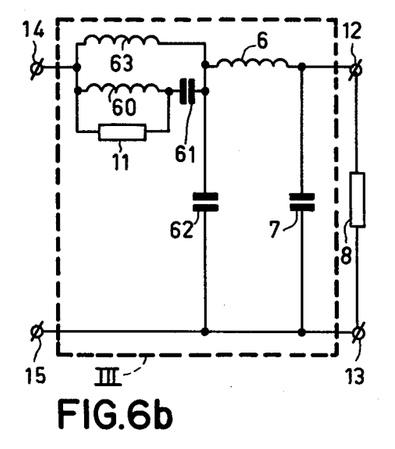

FIG. 6a shows a first inductor 6 connected between an output terminal 14 of the rectifier circuit and one terminal 12 of the load 8. A first capacitor 61 is connected in series with a parallel circuit composed of a second inductor 60 and a resistor 11 across the output terminals 14 and 15 of the rectifier circuit. A second capacitor 7 is connected across the terminals 12 and 13 of the load 8. In the filter network of FIG. 6b first and second inductors 63 and 6, respectively, are serially connected between a first output terminal 14 of the rectifier circuit and a first terminal 12 of the load 8. A third inductor 60 and a resistor 11 are connected to form a parallel circuit which is connected in series with a first capacitor 61 across the first inductor 63. A second capacitor 7 is connected across the terminals of the load. A third capacitor 62 has one terminal coupled to the junction point between the first and second inductors 63 and 6, respectively, and a second terminal coupled to a second output terminal 15 of the rectifier circuit and to the second terminal 13 of the load.

Figure 6C:
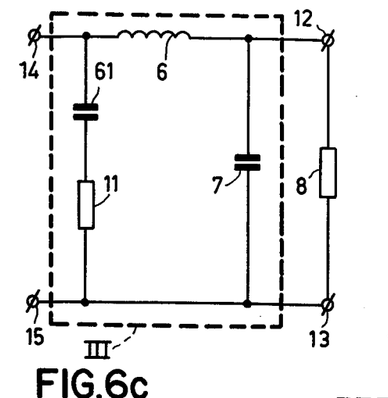
Figure 6D:
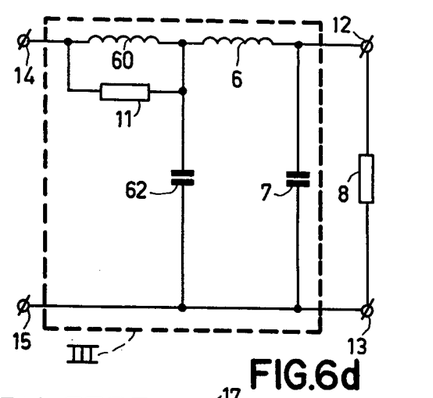

FIG. 6c also shows a first inductor 6 coupled between rectifier circuit output terminal 14 and the load terminal 12. A first capacitor 61 and a resistor 11 are connected in series circuit across output terminals 14 and 15 of the rectifier circuit. A second capacitor 7 is again connected across the load terminals 12 and 13. FIG. 6d includes first and second inductors 60 and 6, respectively, serially connected between a first output terminal 14 of the rectifier circuit and a first load terminal 12. A first capacitor 7 is connected across the load terminals 12 and 13 and a resistor 11 is connected in parallel with the first inductor 60. A second capacitor 62 is connected in a manner similar to that of capacitor 62 in FIG. 6b.

Figure 6E:
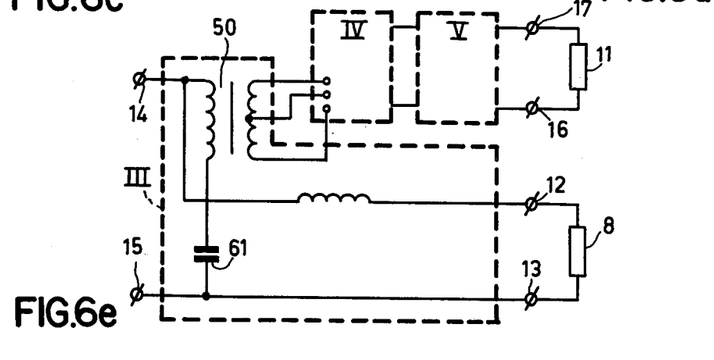
Figure 6F:
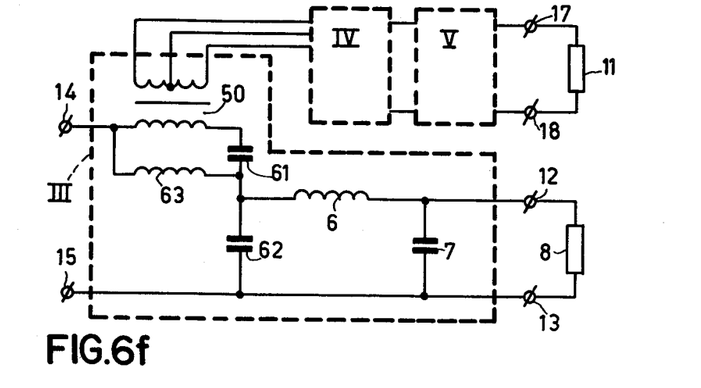

In FIG. 6e a capacitor 61 is connected in series with the primary winding of a transformer 50 across the output terminals 14 and 15 of the rectifier circuit. An inductor is coupled between the first output terminal 14 of the rectifier circuit and a first load terminal 12. A second rectifier circuit IV has input terminals coupled to a secondary winding of transformer 50 and output terminals coupled to a load impedance 11 via a second filter circuit V. FIG. 6f shows a primary winding of a transformer 50 connected in series with a first capacitor 61 and a first inductor 6 between a first output terminal 14 of the rectifier circuit and a first terminal 12 of the load 8. A second inductor 63 is connected across the series combination of the primary winding and the first capacitor 61. A second capacitor 7 is connected across load terminals 12 and 13. A third capacitor 62 is connected between the junction point of the first and second inductors 6 and 63, respectively, and the second terminals 15 and 13 of the rectifier circuit and the load 8, respectively. A second rectifier circuit IV is again connected to the terminals of the secondary winding of transformer 50 and to a load impedance 11 via a second filter circuit V.

The filter V of the supply system shown in FIG. 3 may alternatively be replaced by one of the filters III shown in FIGS. 6e and 6f, as may the filter III of the supply system shown in FIG. 3. However, compared with the respective FIGS. 6a and 6b the choke 60 and the resistor 11 have, in the filters of FIGS. 6e and 6f been replaced by the primary winding of the transformer 50. The secondary winding of the transformer 50 is connected to the rectifier IV. Also here the use of still higher order filters is possible.

The residual energy (indicated in the diagram of FIG. 4 in voltage waveform by means of the dotted areas) is dissipated in resistor 38 in the supply system of FIG. 3. By again replacing the parallel combination of choke 35 and resistor 38 by the primary winding of a transformer this residual 4.57% of the input power of the filter III can also be made useful, for example by stepping up said voltage by means of the transformer and/or using a rectifying voltage multiplier circuit, for example for generating the high voltage required for feeding photodiode circuits in receivers in optical transmission systems.

It has been calculated in the foregoing how the direct current energy available at the output terminals 16 and 17 of the supply system shown in FIG. 3 can be added to the direct current energy available at the output terminals 12 and 13 of that supply system in order to obtain a higher efficiency in the supply system. However, such addition is not essential and is specifically not applicable when a second direct current output which has a different voltage than occurs between the output terminals 12 and 13 is required. In principle any voltage is obtainable between the output terminals 16 and 17 by suitably choosing the transformation ratio of the transformer 50. In order to ensure that there is no change in the functioning of filter III, the value of the resistance introduced into the network of filter III by the transformer 50 must, however, always be the same as the value of the resistance 8.

In another embodiment of the invention, the transformer 50 of FIG. 3 is not connected to a rectifier IV and to a filter V, but directly to an alternating current energy load having a constant real input impedance, for example for heating or lighting purposes.

What is claimed is:

1. An electrical power supply system comprising, a rectifier circuit having input terminals for connection to a source of alternating voltage or current, a load, and a smoothing filter coupling output terminals of said rectifier circuit to said load, the combination of said smoothing filter and said load being chosen so that the input impedance of said smoothing filter is substantially real for the overall frequency spectrum applied to said filter by said rectifier circuit and has substantially the same value for each component of said frequency spectrum.

2. A system as claimed in claim 1, wherein the combination of said load and said filter together comprise a network which has a real input impedance which is independent of frequency.

3. A system as claimed in claim 2, wherein said load is resistive and wherein said filter comprises the parallel combination of an inductor and a resistor connecting one output terminal of said rectifier circuit to one terminal of said load, a capacitor connected in parallel with said load, and which includes a direct connection from the other output terminal of said rectifier circuit to the other terminal of said load.

4. A system as claimed in claim 2, characterized in that the filter is a higher order filter.

5. An electrical power supply system comprising, a first rectifier circuit having input terminals for connection to a source of AC supply voltage, a resistive load, a first filter circuit including a transformer having a primary winding coupling one output terminal of the first rectifier circuit to one terminal of the load and a capacitor connected in parallel with the load, a direct connection from an other output terminal of the first rectifier circuit to another terminal of said load, a second rectifier circuit having input terminals coupled to a secondary winding of the transformer and output terminals coupled to a load impedance via a second filter circuit, and wherein the combination of said first filter circuit and said resistive load together form a network which has a real input impedance which is independent of frequency and the combination of the second filter circuit and the load impedance coupled thereto form a second network which has a real input impedance which is independent of frequency.

6. A power supply system as claimed in claim 2 wherein said filter comprises, a first inductor coupled between a first output terminal of the rectifier circuit and a first terminal of the load, a first capacitor, a second inductor and a resistor connected to form a parallel circuit, means connecting the first capacitor and the parallel circuit in series across the output terminals of the rectifier circuit, and a second capacitor connected across the terminals of the load.

7. A power supply system as claimed in claim 2 wherein said filter comprises, first and second inductors serially connected between a first output terminal of the rectifier circuit and a first terminal of the load, a first capacitor, a third inductor and a resistor connected to form a parallel circuit, means connecting the first capacitor and the parallel circuit in series across said first inductor, a second capacitor connected across the terminals of the load, and a third capacitor having one terminal coupled to a junction point between the first and second inductors and a second terminal coupled to a second output terminal of the rectifier circuit and a second terminal of the load.

8. A power supply system as claimed in claim 2 wherein said filter comprises, a first inductor coupled between a first output terminal of the rectifier circuit and a first terminal of the load, a first capacitor, a resistor, means connecting said first capacitor and said resistor in series circuit across the output terminals of the rectifier circuit, and a second capacitor connected across the terminals of the load.

9. A power supply system as claimed in claim 2 wherein said filter comprises, first and second inductors serially connected between a first output terminal of the rectifier circuit and a first terminal of the load, a resistor connected in parallel with the first inductor, a first capacitor connected across the terminals of the load, and a second capacitor having one terminal coupled to a junction point between the first and second inductors and a second terminal coupled to a second output terminal of the rectifier circuit and to a second terminal of the load.

10. A power supply system as claimed in claim 2 wherein said filter comprises, a capacitor, a transformer having a primary winding and a secondary winding, means connecting the primary winding and the capacitor in series across the output terminals of the rectifier circuit, an inductor coupled between a first output terminal of the rectifier circuit and a first terminal of the load, a second rectifier circuit having input terminals coupled to the secondary winding of the transformer and output terminals coupled to a load impedance via a second filter circuit, and wherein the combination of the second filter circuit and the load impedance coupled thereto form a second network which has a real input impedance which is independent of frequency.

11. A power supply system as claimed in claim 2 wherein said filter comprises, a transformer having a primary winding and a secondary winding, means connecting the primary winding in series with a first capacitor and a first inductor between a first output terminal of the rectifier circuit and a first terminal of the load, a second inductor connected across the series combination of the primary winding and the first capacitor, a second capacitor connected across the terminals of the load, a third capacitor having one terminal coupled to a junction point between the first and second inductors and a second terminal coupled to a second output terminal of the rectifier circuit and a second terminal of the load, a second rectifier circuit having input terminals coupled to the secondary winding of the transformer and output terminals coupled to a load impedance via a second filter circuit, and wherein the combination of the second filter circuit and the load impedance coupled thereto form a second network which has a real input impedance which is independent of frequency.

12. A power supply system as claimed in claim 1 wherein said load is resistive and the filter comprises the parallel combination of an inductor and a resistor coupling one output terminal of the rectifier circuit to one terminal of the load, a capacitor connected in parallel with the load, and means connecting a second output terminal of the rectifier circuit to a second terminal of the load, and wherein the load and resistor each have a resistance value R, the inductor has an inductance value L and the capacitor has a capacitance value C, and wherein the elements of the filter and load satisfy the relation $L/C = R^2$.

13. A power supply system as claimed in claim 5 wherein the second filter circuit comprises the parallel combination of an inductor and a resistor coupling one output terminal of the second rectifier circuit to one terminal of said load impedance, a second capacitor connected in parallel with the load impedance, and a direct connection from a second terminal of the load impedance to a center tap on the secondary winding of the transformer.

14. A power supply system as claimed in claim 5 wherein the second filter circuit comprises, a first inductor coupled between a first output terminal of the second rectifier circuit and a first terminal of the load impedance, a second capacitor, a second inductor and a resistor connected to form a parallel circuit, means connecting the second capacitor and the parallel circuit in series across the output terminals of the second rectifier circuit, and a third capacitor connected across the terminals of the load impedance.

15. A power supply system as claimed in claim 5 wherein the second filter comprises, first and second inductors serially connected between a first output terminal of the second rectifier circuit and a first terminal of the load impedance, a second capacitor, a third inductor and a resistor connected to form a parallel circuit, means connecting the second capacitor and the parallel circuit in series across said first inductor, a third capacitor connected across the terminals of the load impedance, and a fourth capacitor having one terminal coupled to a junction point between the first and second inductors and a second terminal coupled to a second output terminal of the second rectifier circuit and to a second terminal of the load impedance.

16. A power supply system as claimed in claim 5 wherein the second filter circuit comprises, a first inductor coupled between a first output terminal of the second rectifier circuit and a first terminal of the load impedance, a second capacitor, a resistor, means coupling the second capacitor and the resistor in series circuit across the output terminals of the second rectifier circuit, and a third capacitor connected across the terminals of the load impedance.

17. A power supply system as claimed in claim 5 wherein the second filter circuit comprises, first and second inductors serially connected between a first output terminal of the second rectifier circuit and a first terminal of the load impedance, a resistor connected in parallel with the first inductor, a second capacitor connected across the terminals of the load impedance, and a third capacitor having one terminal coupled to a junction between the first and second inductors and a second terminal coupled to a second output terminal of the second rectifier circuit and to a second terminal of the load impedance.

18. A power supply system as claimed in claim 5 wherein said load impedance is resistive and the second filter circuit comprises the parallel combination of an inductor and a resistor coupling one output terminal of the second rectifier circuit to one terminal of the load impedance, a second capacitor connected in parallel with the load impedance, and means connecting a second output terminal of the second rectifier circuit to a second terminal of the load impedance, and wherein the load impedance and resistor each have a resistance value R, the inductor has an inductance value L and the second capacitor has a capacitance value C, and wherein the elements of the second filter circuit and load impedance satisfy the relation $L/C = R^2$.

19. A power supply system comprising, a rectifier circuit having input terminals for connection to a source of AC voltage and output terminals, a load, a filter circuit coupled between the rectifier circuit output terminals and the terminals of the load, and wherein said filter circuit and said load together form a constant R type network which exhibits a real input impedance independent of frequency for the frequency spectrum applied to said filter circuit.

20. A power supply system as claimed in claim 19 wherein the load is resistive and the filter circuit comprises an inductor and resistor in parallel between one output terminal of the rectifier circuit and one terminal of the load, the filter circuit further comprising a capacitor connected in parallel with the load and a direct connection between a second output terminal of the rectifier circuit and a second terminal of the load.

21. A power supply system as claimed in claim 20 wherein the resistor and the resistive load each have a resistance value R, the inductor has an inductance value L and the capacitor a capacitance value C, and wherein the element of the filter circuit and load are chosen to satisfy the relation $L/C = R^2$.

22. A power supply system as claimed in claim 21 wherein the elements of the filter circuit are chosen so as to provide a non-resonant network for said frequency spectrum and in which the input impedance of the filter circuit is real over said frequency spectrum and has a constant value for each frequency component thereof.

* * * * *

UNITED STATES PATENT AND TRADEMARK OFFICE
CERTIFICATE OF CORRECTION

PATENT NO. : 4,462,071

DATED : July 24, 1984

INVENTOR(S) : HUIBERT BLOK

It is certified that error appears in the above-identified patent and that said Letters Patent is hereby corrected as shown below:

In the Abstract:

Last line, change "$L/C = R_2$" to --$L/C = R^2$--

In the Claims:

Claim 21, line 5, change "element" to --elements--

Claim 22, line 1, change "21" to --19--

Signed and Sealed this

Twentieth Day of May 1986

[SEAL]

Attest:

DONALD J. QUIGG

Attesting Officer

Commissioner of Patents and Trademarks